United States Patent
Pestke et al.

(10) Patent No.: US 11,691,478 B2
(45) Date of Patent: Jul. 4, 2023

(54) BRAKE DEVICE FOR AN ADJUSTABLE VENT OUTLET OF A MOTOR VEHICLE

(71) Applicant: ILLINOIS TOOL WORKS INC., Glenview, IL (US)

(72) Inventors: Joachim Pestke, Enkenbach-Alsenborn (DE); Günther Krämer, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/985,598

(22) Filed: Aug. 5, 2020

(65) Prior Publication Data
US 2021/0046804 A1 Feb. 18, 2021

(30) Foreign Application Priority Data

Aug. 16, 2019 (DE) .................. 10 2019 122 061.0

(51) Int. Cl.
*B60H 1/34* (2006.01)
*F24F 13/14* (2006.01)

(52) U.S. Cl.
CPC ........... *B60H 1/3421* (2013.01); *F24F 13/14* (2013.01); *B60H 2001/3471* (2013.01)

(58) Field of Classification Search
CPC .......... B60H 1/3421; B60H 2001/3471; B60H 2001/3464; B60H 1/3414; B60H 1/24; B60H 1/3435; B60H 2001/3492; B60H 1/0065; B60H 1/00857; B60H 1/345; B60H 1/00528; F24F 13/14; F16M 2200/027; E05Y 2201/21; E05Y 2201/266; E05D 11/08; E05D 11/082; E05D 11/084; E05D 2011/085; Y10T 24/44402; Y10T 24/4441;
(Continued)

(56) References Cited

U.S. PATENT DOCUMENTS 5,620,082 A * 4/1997 Saito ...................... A24C 5/326
  198/459.1
6,029,777 A * 2/2000 Rogelja .................... A62B 1/14
  182/193

(Continued)

FOREIGN PATENT DOCUMENTS

CA 2127065 A1 12/1995
CN 208515341 U 2/2019
(Continued)

OTHER PUBLICATIONS

Lichner et al., DE 19635165 Lichner 1997 Espacenet Machine Translation, Mar. 1997, German Patent and Trade Mark Office (Year: 1997).*

*Primary Examiner* — Steven B McAllister
*Assistant Examiner* — Cole N Friedman
(74) *Attorney, Agent, or Firm* — Thompson Hine LLP

(57) ABSTRACT

A brake device (100) for braking the movement of at least one movable element (1) relative to a housing (2) of an air outlet, wherein the movable element (1) is an air-flow-directing and/or air-flow-limiting element and/or an actuation element, wherein the brake device (100) has at least one resilient element (4), wherein the resilient element (4) has a main extent direction which is orientated at least substantially perpendicularly to a movement path of the at least one movable element (1). An air outlet, having such a brake device, is also provided.

12 Claims, 2 Drawing Sheets

(58) Field of Classification Search
CPC ......... F16D 2127/002; F16D 2127/007; F16D 65/0977; F16D 65/0972; F16D 65/0971; F16D 69/00
USPC ................. 454/152, 154, 155; 188/166, 167
See application file for complete search history.

(56) References Cited

U.S. PATENT DOCUMENTS

| | | | | |
|---|---|---|---|---|
| 6,416,043 | B1 * | 7/2002 | Eisenbraun | B60H 3/0028 |
| | | | | 422/123 |
| 8,717,506 | B2 * | 5/2014 | Austin | F16M 11/125 |
| | | | | 348/836 |
| 9,657,793 | B2 * | 5/2017 | Sander | F16D 65/0976 |
| 9,919,585 | B2 * | 3/2018 | Noichl | F24F 13/1426 |
| 2006/0040606 | A1 * | 2/2006 | Park | B60H 1/3428 |
| | | | | 454/155 |
| 2011/0319005 | A1 * | 12/2011 | Sawada | B60H 1/00678 |
| | | | | 454/155 |
| 2019/0366808 | A1 * | 12/2019 | Kang | B60H 1/3421 |

FOREIGN PATENT DOCUMENTS

| | | | | |
|---|---|---|---|---|
| DE | 19635165 | A1 | 3/1997 | |
| DE | 20019038 | U1 * | 5/2001 | ........... B60H 1/3414 |
| DE | 20118274 | U1 | 1/2002 | |
| DE | 102006049367 | A1 | 4/2008 | |
| EP | 0405380 | A1 * | 1/1991 | ........... B60H 1/3435 |

* cited by examiner

BRAKE DEVICE FOR AN ADJUSTABLE VENT OUTLET OF A MOTOR VEHICLE

TECHNICAL FIELD

The invention relates to a brake device for braking the movement of at least one movable element relative to a housing, preferably relative to a housing of an air outlet. The invention further relates to a device, preferably an air outlet, having such a brake device.

BACKGROUND

Air outlets are typically used in vehicles for ventilating a vehicle inner space. The air outlet is to this end arranged, for example, in the instrument panel region of a vehicle and directs an air flow flowing through an air channel in the direction of the vehicle inner space. For redirection or throttling or for complete interruption of the air flow, an air-flow-directing element and/or air-flow-limiting element (referred to in the following description for reasons of simplicity also as a plate) is arranged inside the air channel. The air-flow-directing and/or air-flow-limiting element can typically be rotated about a pivot axis, wherein, by means of rotation of the air-flow-directing and/or air-flow-limiting element about the pivot axis thereof, the direction of the outgoing air can be adjusted.

So that there is no undesirable self-adjustment of the air-flow-directing and/or air-flow-limiting element, it is necessary to predetermine the minimum force required in order to adjust the air-flow-directing and/or air-flow-limiting element.

The force adjustment can be carried out in this instance, for example, by means of resilient elements, such as coupling rods, which tension the air-flow-directing and/or air-flow-limiting elements in the direction of the axis thereof.

With such an embodiment, however, there is a problem that the coupling rods are often produced from plastics material. These coupling rods which are produced from plastics material relax over time so that the friction forces which are applied for force adjustment are reduced. Consequently, the movement forces are also reduced over time.

For aesthetic reasons, some outlets further have only a few, preferably only one, horizontally arranged plate. In this instance, the operating force produced by means of a metal coupling rod as a result of the reduced number of friction faces which are preferably arranged at the end face on the plate bearings is also no longer sufficient. It is also disadvantageous in this instance, as a result of the small friction diameter, that no (sufficiently) high brake torques can be achieved. As a counter-measure, it is also in this instance not possible to increase the friction using a greater surface pressure since as a result an uncontrollable wear of the friction faces would be brought about.

Another possibility of preventing the self-adjustment of the plates involves producing friction forces in the plate bearing locations.

The disadvantage of the embodiment described is, however, that with such a structure, an increasing number of bearing locations has to be used at the same time in order to produce friction or movement forces. A combination of friction forces in a radial and axial direction thus also takes place so that it is generally very difficult to determine which bearing location actually makes which contribution in terms of friction force to the overall system.

Consequently, the force adjustment to a predetermined level is subjected to numerous iteration steps so that an appropriate prediction for the adjustment of a specific force level is hardly possible. Furthermore, relaxation effects and occurrences of wear also appear in this case and make the stable retention of a force level difficult.

Particularly with long tolerance chains in which the brake element is also used to compensate for the tolerances, the use of brake elements of silicone leads to problems. Thus, brake elements of silicone have a steep spring characteristic curve, by means of which only a small tolerance compensation is possible.

SUMMARY

Based on the prior art set out, an object of the invention is to provide a brake device for braking the movement of a movable element relative to a housing which overcomes the problems and the disadvantages of the prior art mentioned above. In particular, an object of the present invention is to provide a brake device which allows a compensation of tolerances in the system, enables a defined adjustment of a movement force at (a) defined locations(s) and allows simple correction of the force adjustment.

Furthermore, an object of the invention is to provide a device, preferably an air outlet, for a vehicle which also overcomes the above-mentioned problems and disadvantages of the prior art.

The solution according to the invention involves providing a brake device for braking the movement of at least one movable element relative to a housing, preferably relative to a housing of an air outlet, wherein the movable element is an air-flow-directing and/or air-flow-limiting element and/or an actuation element, wherein the brake device has at least one resilient element, characterized in that the resilient element has a main extent direction which is orientated at least substantially perpendicularly to a movement path of the at least one movable element.

The movement path or movement curve is intended to be understood to be the path along which the movable element moves. In this instance, the main extent direction of the resilient element in the installed state is always (that is to say, along the entire movement path) orientated at least substantially perpendicularly to the movement path. More specifically, the main extent direction is always at least substantially perpendicular to the point of the movement path at which the movable element is currently located.

Another solution according to the invention involves providing a brake device for braking the movement of at least one movable element relative to a housing, preferably relative to a housing of an air outlet, wherein the movable element is an air-flow-directing and/or air-flow-limiting element and/or an actuation element, wherein the brake device has at least one resilient element, characterized in that the resilient element is arranged so far away from a bearing location, preferably a pivot axis, of the at least one movable element that it brakes the movement in a region which is arranged remote from the bearing location, preferably the pivot axis.

The movement of the movable element may be a rotational movement about a pivot axis. Alternatively, a movement along any curve is also possible. The friction forces which are produced during the movement load the resilient element transversely relative to the main extent direction of the spring.

The main extent direction of the resilient element is the extent direction of the resilient element in which the resilient element is longest. The term "at least substantially perpendicularly" is also intended to be understood to be a direction which deviates by up to 5 degrees from a precise perpendicular of the movement path.

The movable element may be an air-flow-directing and/or air-flow-limiting element. The air-flow-directing and/or air-flow-limiting element is typically a plate (preferably an H-plate) of the air outlet. A plurality of plates may also be arranged, but preferably only one plate is arranged in the air outlet.

Alternatively, the movable element may also be an actuation element, for example, a sliding knob or an operating wheel. If the description mentions in places an air-flow-directing element and/or air-flow limiting element or a plate, the described teaching can also be accordingly applied to an actuation element.

When the movement of the movable element is a rotational movement, the main extent direction of the resilient element is orientated at least substantially parallel with the pivot axis of the movable element. If the rotational movement of the movable element is braked there in a region which is arranged remote from the pivot axis, the main extent direction of the resilient element in the installed state is in particular not orientated concentrically relative to the pivot axis.

Both solutions according to the invention afford the advantage that, via the resilient element, a defined adjustment of the movement force is possible.

As a result of the simple structure, it is further possible to determine in a simple manner how much friction force with respect to the entire system is applied by means of the resilient element.

For the resilient element, spring steel is preferably used so that there is no or hardly any relaxation. Consequently, a durable product in which the movement force itself can be kept constant over the duration of a continuous activation is obtained.

On the whole, the individual component and system tolerances can be minimized, which leads to a reduction of the operating force fluctuations.

According to an advantageous development of the invention, the resilient element is arranged in a recess of the movable element.

An extremely simple (predetermined) positioning of the resilient element relative to the movable element is thereby achieved.

Preferably, the recess is arranged at an end face of the movable element or the air-flow-directing and/or air-flow-limiting element. In a particularly preferred manner, there is arranged on an end face in each case a recess in which a resilient element is inserted so that, as a result of the symmetrically produced brake torques, no bending of the plate can occur. This leads to a plate which runs smoothly and without any slip-stick effect and which at the same time has smooth operating haptics.

In the embodiment described, the movement between the resilient element and housing of the air outlet is braked. Alternatively, it would be conceivable for the resilient element to be arranged (for example, in a recess) of the housing so that the movement between the movable element and resilient element is then braked.

According to an advantageous development of the invention, the brake device further has at least one pin, which is arranged on the movable element (for example, plate).

The pin may in this instance, on the one hand, have the function of limiting (end stop) with an associated guide (for example, slot) the movement of the movable element (plate). On the other hand, by means of the pin, a movement can be transmitted to the plate so that the pin can be used to adjust the position of the plate.

The pin preferably extends in the installed state from an end face of the plate.

Preferably, two pins are arranged on a plate so that securing is possible at both end faces.

It is further conceivable for the pin to also be able to perform other functions. For example, it would be possible to control trailing plates via the pin. Consequently an additional function as a mechanical drive for additional elements (for example, via coupling rods, additional plates) would be possible.

According to an advantageous development of the invention, the pin is also arranged in the recess, wherein the resilient element in this instance is arranged at least partially between the pin and the movable element.

That is to say, the resilient element is first arranged in the recess and the pin is then arranged above the resilient element.

Plates typically have in any case the pin which has already been described. In the embodiments described, it is thus possible for the resilient element to be arranged in the plate without providing additional structural space for brake production of the plate. Furthermore, with such an embodiment, it would be conceivable for plates to be able to be retrofitted with a corresponding resilient element.

Consequently, the pin and the resilient element preferably divide a recess. As a result of the fact that the resilient element is arranged in the same region as the pin, the force production of the movement force is carried out close to the application point of the actuation.

According to an advantageous development of the invention, the recess, the resilient element and/or the pin has/have at least one retention device which is constructed to retain the resilient element and/or the pin in the recess.

Furthermore, such a retention device may, of course, also be constructed to retain the pin on the resilient element, or vice versa.

In a particularly preferred manner, at least one (preferably two) retention device(s) is/are arranged and retain(s) the resilient element in the recess and at least one (preferably two) additional retention device(s) which retain(s) the pin on the resilient element. The resilient element consequently also acts as a coupling and closure element between the movable element and pin.

Furthermore, as a result of such an embodiment, a particularly simple assembly is enabled. In particular, the pins which are used separately with the resilient element as a closure element in a cost-effective, purely mechanical assembly process of the components also enable at the same time a greater selection of possibilities with respect to the type and sequence of the individual assembly part-processes.

Typically, the retention devices described can be produced, for example, as hook elements.

According to an advantageous development of the invention, the resilient element is directly or indirectly in frictional contact with a slot and/or a rib as a friction partner so that movements of the movable element relative to the housing, preferably the housing of the air outlet, are braked.

Via the spacing between the resilient element and slot or rib, the deflection of the resilient element and consequently the frictional force (and thereby the movement force) can be adjusted. Furthermore, the movement force can also be adjusted via the friction face between the two friction partners.

As a result of an appropriate selection of material of the friction partners, it is in this instance possible for no scratching or squeaking noises and abrasion to occur.

A direct frictional contact is intended to be understood to be one in which the two elements directly touch each other (without an element arranged therebetween (for example, friction liner)). An indirect frictional contact is accordingly intended to be understood to be one in which the two elements do not directly touch each other but instead an element (for example, friction liner, sliding coating) is arranged between them.

According to an advantageous development of the invention, the slot or the rib has at least one locking device, by means of which the position of the movable element can be fixed relative to the housing.

Using such a locking device, it is possible to move the movable element (for example, the plate) repeatedly into or out of a predefined position.

According to an advantageous development, the brake device further has at least one region of the housing (of the air outlet), wherein the region of the housing has the slot or the rib.

In particular, the slot is bent and is located along the movement curve of the movable element. In the case of a pivotable plate, the slot is concentric relative to the pivot axis of the plate.

According to an advantageous development of the invention, the resilient element extends as at least a single-member resilient element into the slot and comes into frictional contact with at least one inner side of the slot.

Consequently, the resilient element can be moved in a guided manner in the slot.

Using the above embodiments, it is possible in a simple manner to construct a brake device in which the tolerances of the housing length and/or the plate length are no longer significant.

Preferably, the resilient element has two members whose outer sides come into frictional contact with the inner side of the slot.

Consequently, the width of the slot determines the deflection of the resilient members and consequently the friction force thereof with respect to the housing. Via this friction force, the movement force can then be adjusted. Furthermore, the force adjustment can, of course, also be carried out via the pretensioning of the resilient members.

Such an embodiment of the resilient element further has the advantage that a resilient element has "two brakes" so that the required friction torque can be increased. Since the two members of the resilient element act at the same time on two opposing brake faces, there is further an extremely extensive cancellation of the forces so that no additional force influences are produced on the surrounding mechanical system. Consequently, an uncontrolled additional operating force increase as a result of additional, unplanned and/or uncontrollable friction pairings can be prevented to the greatest possible extent. At the same time, using such a dual-member spring, a wear which is caused by the force of the brake spring in the remaining mechanical system of the outlet can be prevented.

Furthermore, with such an embodiment, the sum of the friction forces can be kept almost constant. If, for example, the resilient element is displaced with respect to the center point of the slot in the direction of one member, one member is more highly loaded and the other member is unloaded. Since the resilient element has a substantially linear characteristic line, the normal force in one member decreases in this instance in the same manner as it increases in the other member so that the sum of the friction forces can remain constant.

As a result of the compensating arrangement of the members, a degree of eccentricity between the brake path and center of the plate bearing (pivot axis) is even possible without changing the brake forces.

According to an advantageous development of the invention, the resilient element is at least partially received in a region of the housing and in frictional contact with at least one friction face, in particular with at least one friction face of the air-flow-directing and/or air-flow-limiting element.

This is a reversal of the brake device which has already been described and in which the resilient element is no longer arranged in the air-flow-directing and/or air-flow-limiting element, but instead in the housing of the outlet. Depending on the embodiment, the effects already described can also be achieved here.

According to an advantageous development of the invention, a friction element (for example, also in the form of a coating (e.g., 6a) of the spring) which acts as a brake lining is arranged between the resilient element and/or the rib.

According to an advantageous development of the invention, the resilient element is directly or indirectly in frictional contact with an at least substantially roller-like friction partner so that both in a radial and in an axial direction movements of the resilient element relative to the roller-like friction partner or vice versa are braked.

Consequently, the brake device is in principle also suitable for braking a translational movement at the same time as a rotational movement. The brake face or the friction partner then has, for example, a roller form. The brake forces can in such an embodiment then be adjusted via the diameter of the roller. These may also vary depending on the axial extent of the roller by the diameter of the roller being varied.

According to an advantageous development of the invention, the resilient element when it moves relative to the friction partner is redirected differently by the friction contact so that friction forces between the resilient element and the friction partner along the movement path vary.

In this instance, a selective compensation of non-uniform movement forces/operating forces of a mechanical system can be carried out.

According to an advantageous development of the invention, a plurality, preferably a large number, of simultaneously functioning resilient elements are arranged on the movable element.

Preferably, a spring, in a particularly preferred manner two springs, is/are arranged at the end face on the movable element or the plate.

As a result of the arrangement of a plurality of resilient elements as brakes, each individual brake only has to be able to produce a smaller required friction torque. Consequently, softer springs can be used, which in turn is linked with a large number of advantages. Thus, softer springs prevent excessive wear and/or deformation of the contact or friction faces, and the linked, undesirable brake torque reduction during permanent operation. Furthermore, as a result of softer springs, softer spring characteristic curves can be carried out, which results in a direct reduction of the system-related brake torque tolerances. Furthermore, production tolerances of the springs can be statistically compensated for by multiple arrangement and consequently minimize the fluctuations of the operating forces.

Furthermore, the solution according to the invention involves providing a device, preferably an air outlet, for a vehicle which has the following: at least one movable element, a housing, in which the movable element is movably arranged; and at least one of the brake devices described above, which is constructed to brake a movement of the at least one movable element relative to the housing.

Since the device or the air outlet has the brake devices already described, all aspects which have been discussed in this regard naturally also apply here.

On the whole, with the described brake devices and the air outlet described, the objects set out in the introduction are achieved in a satisfactory manner.

BRIEF DESCRIPTION OF THE DRAWINGS

The invention is explained in greater detail below with reference to the description of embodiments and the appended drawings.

In the drawings.

DETAILED DESCRIPTION

Figure 1:
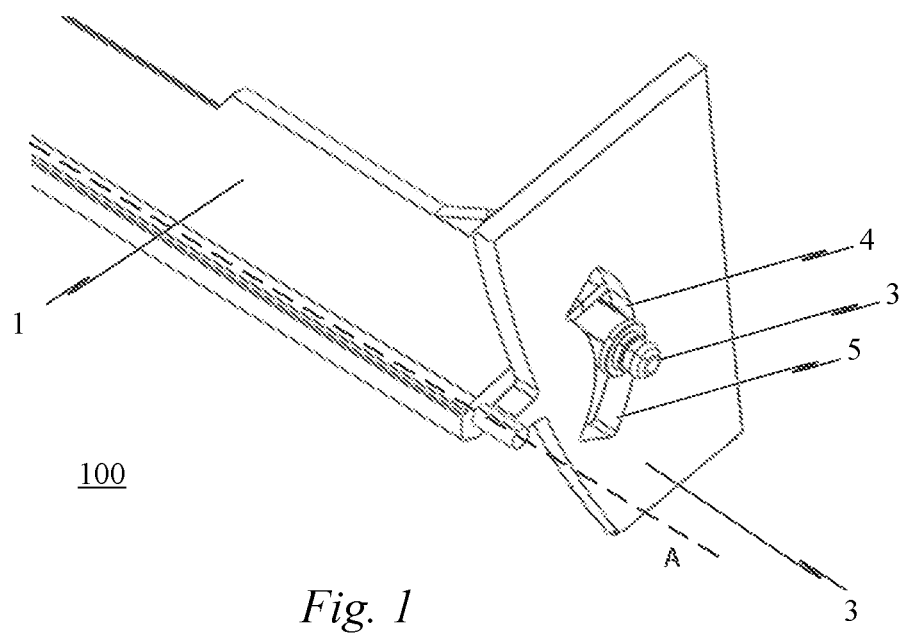
FIG. 1 is a schematic illustration of a brake device for braking the movement of at least one movable element (plate in this instance) relative to a housing (an air outlet in this instance) according to an embodiment of the present invention.

FIG. 1 shows a brake device 100 for braking the movement of a movable element 1. The movable element 1 is in this instance a plate. Therefore, a plate 1 is also referred to below. The plate 1 has a pivot axis A about which the plate 1 can be pivoted or rotated. The pivotable bearing of the plate 1 about the pivot axis A is carried out at the end face on an end of the plate 1. Preferably, this is carried out at both end faces of the plate 1 at one end (in the Figures, at a front end of the end face).

Figure 2:
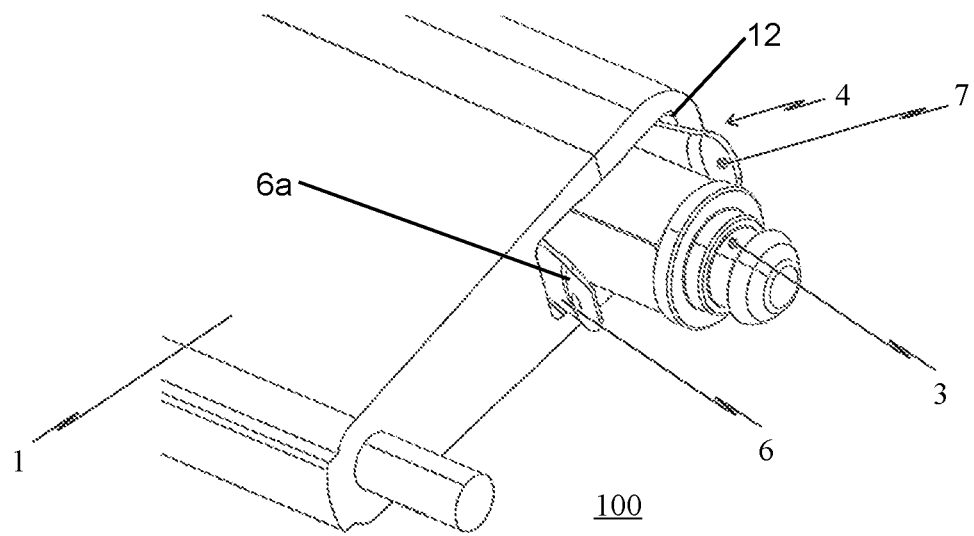
FIG. 2 is an enlarged view of the brake device according to FIG. 1, in which the housing of the air outlet is not illustrated.

As can be seen better in FIG. 2, a resilient element 4 and a pin 3 are also arranged at the end face on the plate 1. In particular, these are arranged at another end of the end face of the plate 1 as the pivot axis A.

Consequently, the brake action is not carried out at the bearing location of the plate 1.

Although in the Figures only an end face of the plate 1 can be seen, the structure at the other end face of the plate 1 is preferably the same as at the illustrated end face of the plate 1.

The pin 3 extends in the assembled state, as can be seen in FIG. 1, in a slot 5 of a housing 2 of the air outlet.

The position of the plate 1 (relative to the housing 2 of the air outlet) may, for example, be changed by means of an operating element which is not illustrated (handle/sliding knob). Consequently, it is, for example, possible to drive additional mechanical elements which are not illustrated by means of the pin 3.

Furthermore, it is possible via the pin 3 to change the position of the plate 1 (relative to the housing 2 of the air outlet).

As can be seen in FIG. 1, the resilient element 4 is tensioned in the slot 5 so that a friction force is produced between the resilient element 4 and the slot 5.

In particular, the resilient element 4, as can be seen, for example, in FIG. 2, has two members 6 and 7 whose outer side or outer face presses in regions against mutually opposite inner faces of the slot 5.

The width of the slot 5 in the housing 2 of the air outlet determines the possible deflection of the members 6 and 7 so that the friction force of the members 6 and 7 with respect to the slot 5 can also be adjusted by the width of the slot. Furthermore, by means of variation of the pretensioning of the resilient element 4, the friction force can also be changed.

If the plate 1 is not moved, normal forces are applied to the inner side of the slot 5 by the members 6 and 7. If the plate 1 is rotated about the pivot axis A thereof, these normal forces result in friction forces which determine the movement forces of the plate 1. That is to say, the resilient element 4 brushes with the members 6, 7 thereof over the inner face or inner side of the slot 5 and produces a friction force.

Since this is a particularly simple arrangement, it is possible to make statements relating to the movement forces in the system and to calculate such movement forces via the spring characteristic and friction coefficients. It is thereby possible, even before starting the development, to move significantly closer to the properties required in large-scale production.

As can be seen in FIG. 1, it is further possible with the present brake device 100 to compensate for tolerances in the production. If, for example, the pivot axis A is displaced relative to the center point of the slot 5, one of the two members (for example, member 6) is unloaded, whilst the other member (for example, member 7) is more heavily loaded. Since the spring has a substantially linear characteristic line, the normal forces in one member 6 are reduced in the same manner as they increase in the other member 7. Overall, the friction force consequently remains almost constant.

Production-related fluctuations in the width of the slot 5 are further compensated for by a spring characteristic line which is as soft as possible in such a manner that fluctuations in the movement force remain within the tolerances.

The resilient force can further be controlled via the slot width in the path of the slot and can consequently compensate, for example, for final-position-related tolerances of the overall mechanical system.

As can be seen in FIG. 2, the resilient element 4 is arranged together with the pin 3 in a common recess 12 of the plate 1. In the installed state, only a distal end of the pin 3 can be seen and extends from the recess 12. Only distal ends of the members 6 and 7 of the resilient element 4 can also be seen and also extend from the plate 1 or the recess 12.

As can also be seen in FIG. 2, in the installed state the main extent direction of the resilient element 4 and independently of this also the main extent direction of the pin 3 is orientated at least substantially perpendicularly to the movement path or the movement direction of the plate 1. That is to say, the pin 3 and independently thereof the resilient element 4 in the installed state are arranged in such a manner that the main extent direction thereof (that is to say, the direction in which the main extent (longest extent) is present; (in the pin, also the axis of symmetry)) is arranged or orientated perpendicularly to the movement path.

In the case illustrated in the Figures, in which the movement is a rotational movement about a pivot axis A, it is additionally the case that the pin 3 and independently of this the resilient element 4 in the installed state are arranged in such a manner that the main extent direction thereof (that is to say, the direction in which the main extent (longest extent) is present; in the pin, also the axis of symmetry) is arranged or orientated parallel with the pivot axis A.

As a result of the fact that the pin 3 and the resilient element 4 are arranged in the same recess 12, the advantage is additionally afforded that the force production of the movement force may be carried out close to the application location of the actuation.

Figure 3:
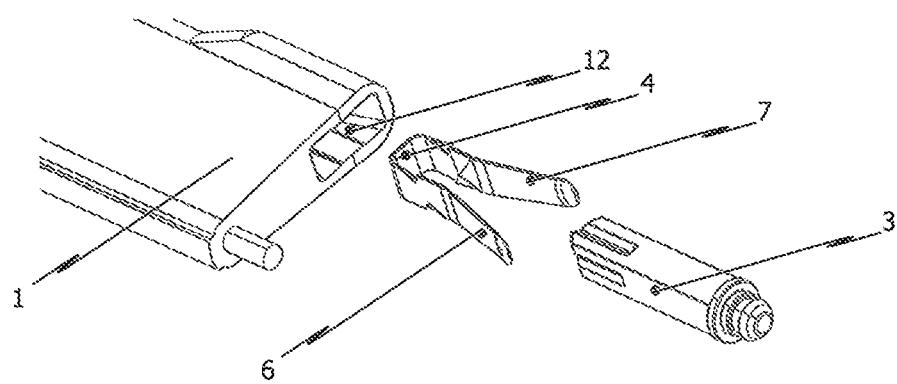
FIG. 3 is a schematic illustration of the brake device according to FIG. 1, wherein a resilient element and a pin of the brake device are shown outside a recess of the air-flow-directing and/or air-flow-limiting element.
Figure 4:
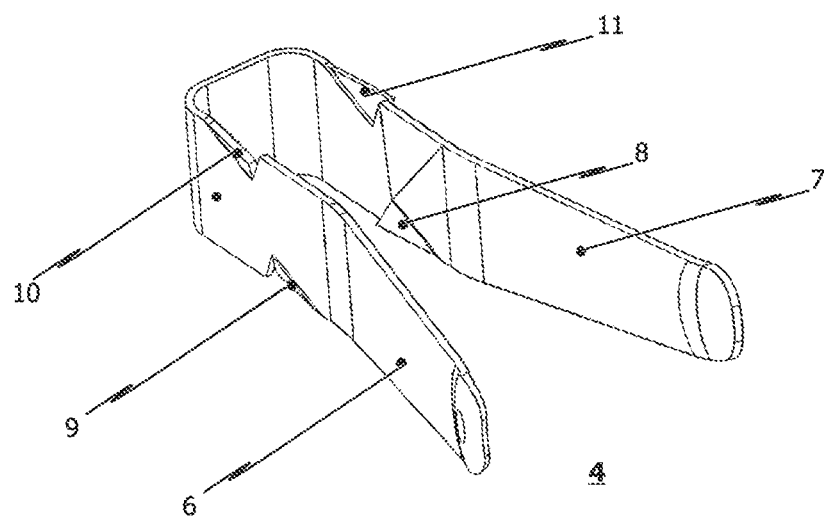
FIG. 4 is an enlarged illustration of the resilient element of the brake device according to the present invention.

FIG. 3 and FIG. 4 show that the pin 3 and the resilient element 4 can be securely clamped by means of a suitable geometry (for example, retention devices 8, 9, 10 and 11) in a non-positive-locking and positive-locking manner in the plate 1. The resilient element 4 is thus retained in the recess 12 of the plate 1 by means of hook elements 10 and 11, which are formed on the resilient element 4. The pin 3 is in turn retained in the resilient element 4 by means of additional hook elements 8 and 9.

In this instance, the pin 3 simultaneously supports and locks the fixing of the resilient element 4 in the plate 1 by a corresponding simultaneous tensioning of all the hook elements 8, 9, 10 and 11. A loss-preventing retention of the resilient element 4 and the pin 3 in the recess 12 is consequently ensured.

Of course, in this context it would also be conceivable for one or more hook elements similar to 8, 9, 10 and 11 which act at the same time to be able to be used. Solutions with only one resilient member or with a plurality of resilient members or resilient arms which extend in the same direction would also be conceivable.

The use with a linear or cam-guided movement would also be conceivable. In place of the slot 5, parallel ribs would also be conceivable and, for example, guide the pin 3 and/or are actively connected to the resilient element 4. With such ribs, an embodiment would also be conceivable in which the action of the normal force acts not from the inner side, but instead from the outer side on a single rib. An opposing action of resilient elements 4 with two members would also be conceivable.

LIST OF REFERENCE NUMERALS

1 Movable element
2 Housing
3 Pin
4 Resilient element
5 Slot
6, 7 Member
8, 9, 10, 11 Retention device
12 Recess
100 Brake device

What is claimed is:

1. A brake device for braking the movement of at least one movable element relative to a housing of an air outlet,
   wherein the movable element is at least one of an air-flow-directing element or air-flow-limiting element or an actuation element,
      wherein the brake device has at least one resilient element,
      wherein the resilient element is spaced apart from a pivot axis of the at least one movable element, such that the resilient element brakes the movement in a region which is arranged remote from the pivot axis;
      wherein the resilient element is arranged in a recess of the movable element;
      wherein the brake device further has at least one pin, which is arranged on the movable element;
      wherein the pin is also arranged in the recess, wherein the resilient element is arranged at least partially between the pin and the movable element;
      wherein the pin includes a free end that is located outside of the recess and that extends beyond an external end of the resilient member;
      wherein the resilient element includes at least one retention device, positioned within the recess, and engaged with the recess to retain the resilient element in the recess.

2. The brake device as claimed in claim 1,
   wherein the resilient element has at least one further retention device engaged with the pin and configured to retain the pin in the recess.

3. The brake device as claimed in claim 1,
   wherein the resilient element is directly or indirectly in frictional contact with at least one of a slot or a rib as a friction partner so that movements of the movable element relative to the housing are braked.

4. The brake device as claimed in claim 3,
   wherein the brake device further has at least one region of the housing,
   wherein the region of the housing has the slot or the rib.

5. The brake device as claimed in claim 4,
   wherein the resilient element extends as at least a single-member resilient element into the slot and comes into frictional contact with at least one inner side of the slot.

6. The brake device as claimed in claim 5,
   wherein a friction element which acts as a brake lining is arranged between the resilient element and at least one of the slot or the rib.

7. The brake device as claimed in claim 1,
   wherein a plurality of simultaneously functioning resilient elements are arranged on the movable element.

8. An air outlet, for a vehicle, which has the following:
   at least one movable element;
   a housing, in which the movable element is movably arranged; and
   at least one brake device as claimed in claim 1, which is constructed to brake a movement of the at least one movable element relative to the housing.

9. The brake device as claimed in claim 1, wherein the at least one retention device comprises a hook element formed on the resilient element, and the at least one further retention device comprises another hook element formed on the resilient element.

10. A brake device for braking the movement of at least one movable element relative to a housing of an air outlet,
   wherein the movable element is at least one of an air-flow-directing element, an air-flow-limiting element or an actuation element,
   wherein the brake device has at least one resilient element,
   wherein the resilient element is spaced apart from a pivot axis of the at least one movable element, such that the resilient element brakes the movement in a region which is spaced from the pivot axis;
   wherein the resilient element is arranged in a recess of the movable element;
   wherein the brake device further has at least one pin, which is arranged on the movable element;
   wherein the pin is also arranged in the recess, wherein the resilient element is arranged at least partially between the pin and the movable element;
   wherein the resilient element has two members whose outer side or outer face presses in regions against mutually opposite inner faces of a slot of the housing;

wherein the pin includes a free end that is located outside of the recess and that extends beyond an external end of each of the two members and through the slot of the housing;

wherein at least one retention device is positioned within the recess and configured to retain the resilient element within the recess.

11. The brake device as claimed in claim 10, wherein the at least one retention device comprises a hook element formed on the resilient element and engaged with the recess.

12. The brake device as claimed in claim 11, wherein a further hook element is formed on the resilient element and engaged with the pin to retain the pin within the recess.

* * * * *